April 19, 1960  G. E. ALPHIN, JR  2,933,206
TOBACCO HARVESTER
Filed April 24, 1956  6 Sheets-Sheet 1
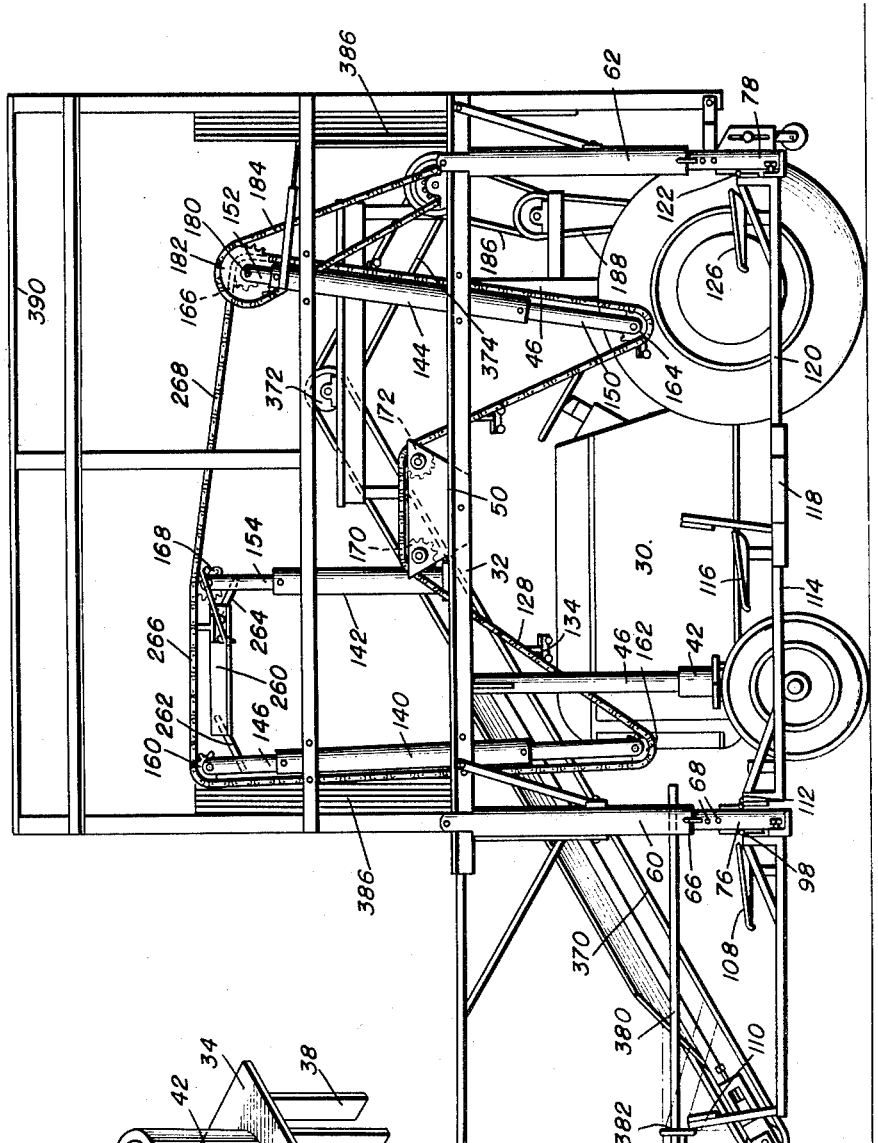
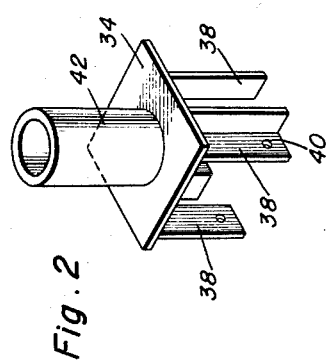
Gilbert E. Alphin, Jr.
INVENTOR.

April 19, 1960                G. E. ALPHIN, JR                2,933,206
                              TOBACCO HARVESTER
Filed April 24, 1956                                    6 Sheets-Sheet 2
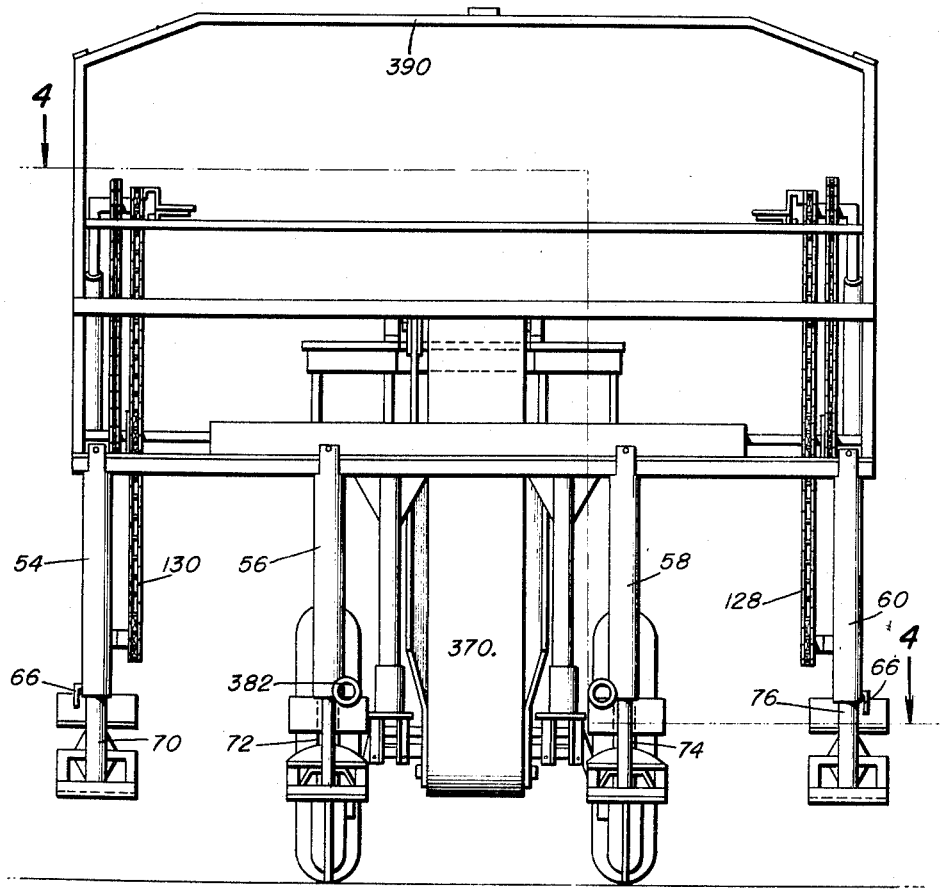
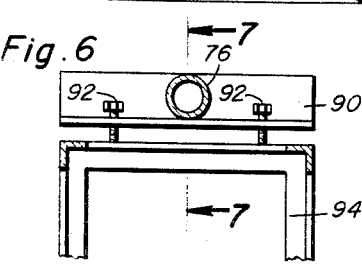
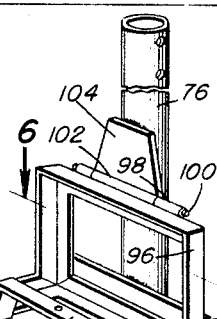
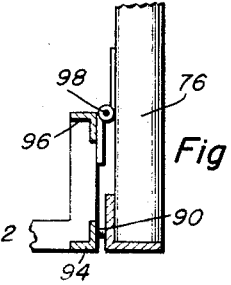
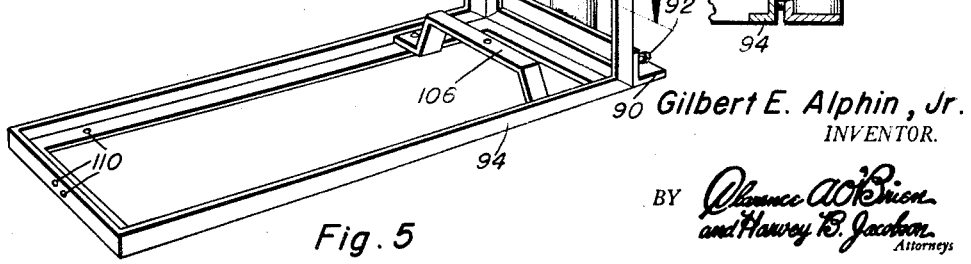
Gilbert E. Alphin, Jr.
INVENTOR.

April 19, 1960  G. E. ALPHIN, JR  2,933,206
TOBACCO HARVESTER
Filed April 24, 1956  6 Sheets-Sheet 3
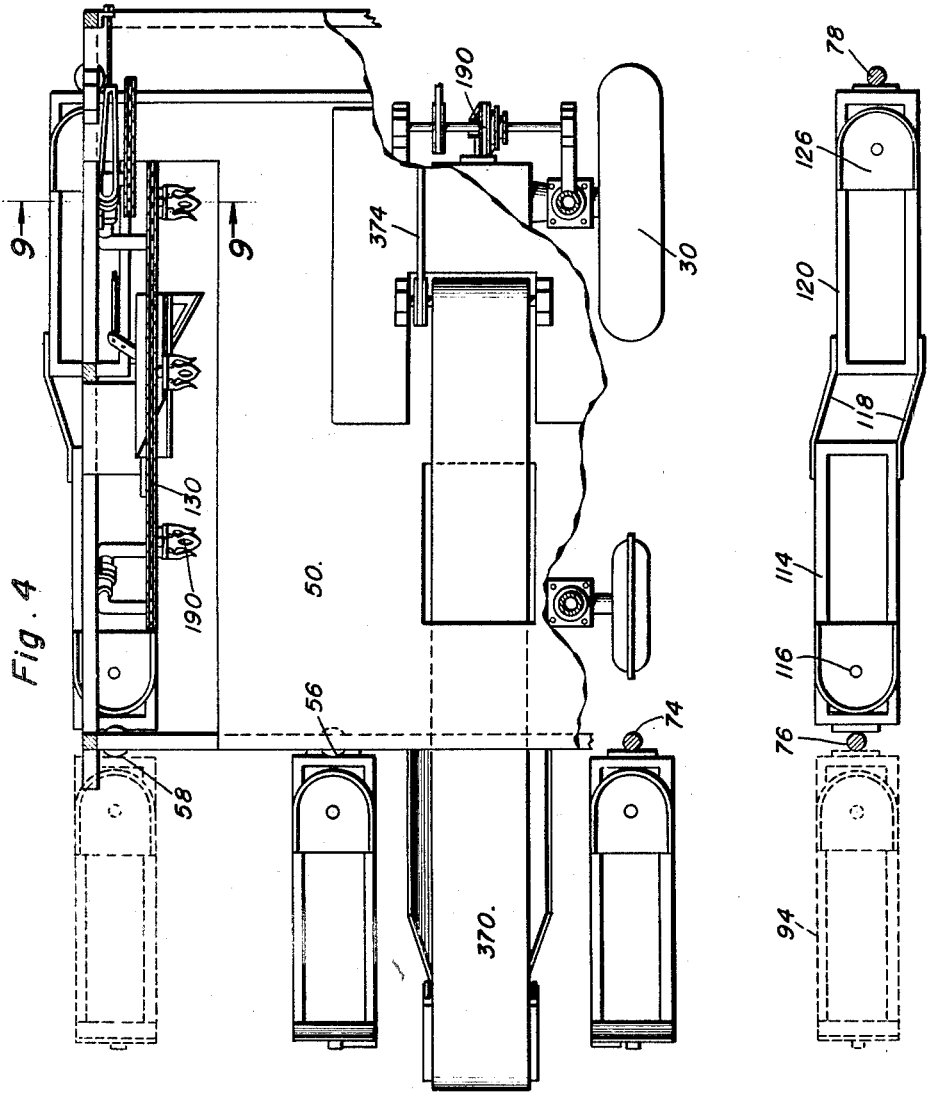
Gilbert E. Alphin, Jr.
INVENTOR.
BY *Clarence A. O'Brien*
*and Harvey B. Jackson*
Attorneys April 19, 1960  G. E. ALPHIN, JR  2,933,206
TOBACCO HARVESTER
Filed April 24, 1956  6 Sheets-Sheet 4

Gilbert E. Alphin, Jr.
INVENTOR.

BY *Clarence A. O'Brien*
*and Harvey B. Jacobson*
Attorneys

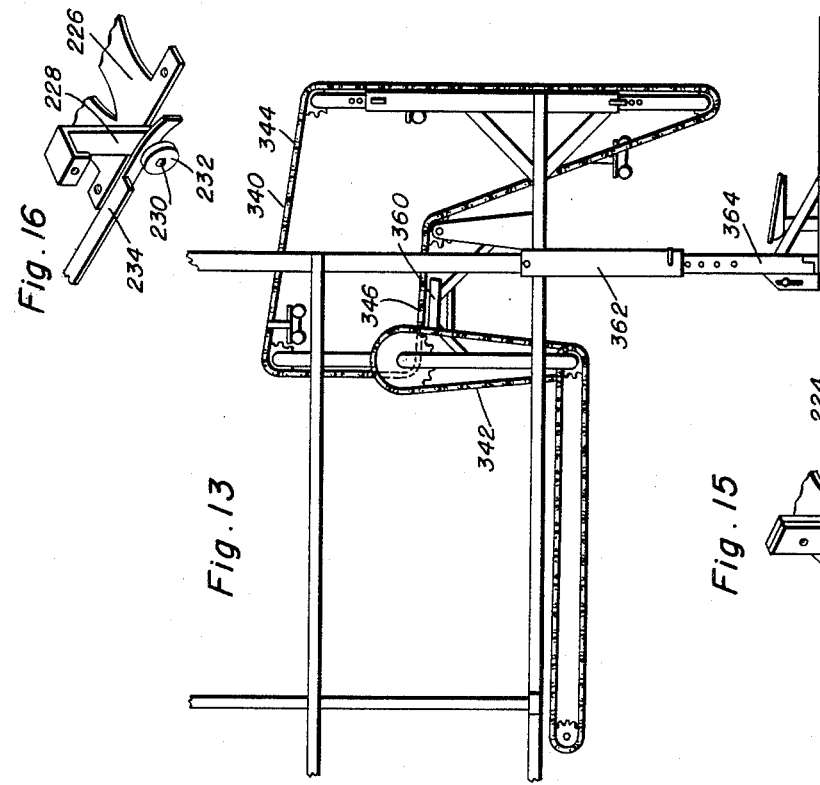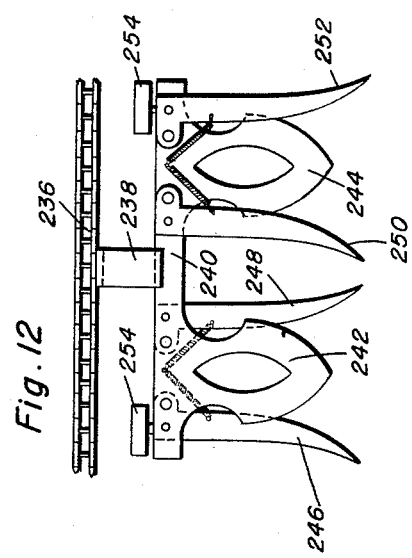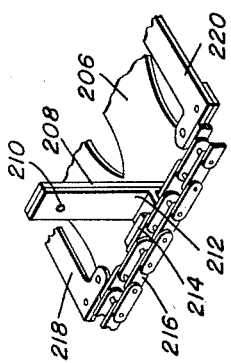

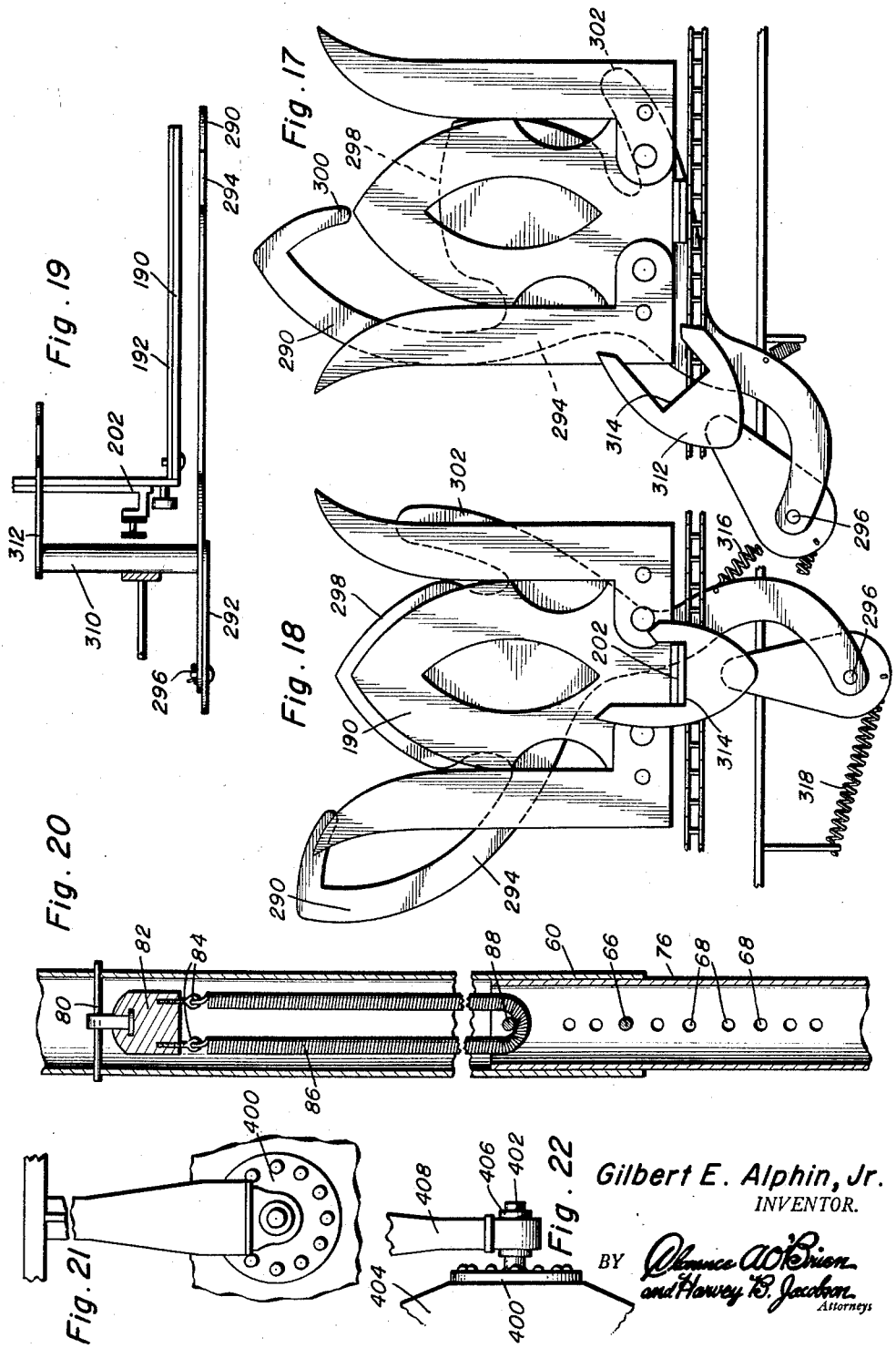

United States Patent Office 2,933,206
Patented Apr. 19, 1960

2,933,206

TOBACCO HARVESTER

Gilbert E. Alphin, Jr., Kenansville, N.C.

Application April 24, 1956, Serial No. 580,276

3 Claims. (Cl. 214—5.5)

This invention relates to the class of agricultural equipment and more particularly to a new concept in tobacco harvesters.

The construction of this invention features a tobacco harvester especially adapted for increased speed of conveying of tobacco leaves from the primers or pickers to the loopers on the platform of the tobacco harvester. Incorporated in the invention is not only an endless belt conveyor but endless chain conveyors.

An important object of the present invention resides in the provision of means for automatically removing tobacco leaves from the clips mounted on the endless conveyor chains of a tobacco harvester so that if a looper on the platform of the tobacco harvester should fail to move the tobacco leaves from clips, the tobacco leaves will be automatically removed and deposited on the platform.

A further object of the invention resides in the provision of novel means for suspending the seats of a tobacco harvester at variable heights so that the different leaves of the tobacco plants may be picked as they grow ripe.

One of the features of the invention lies in the provision of means for rotating the seat suspension means so that the seats may alternatively be positioned adjacent the conveyor chains or adjacent a conveyor belt.

Another object of the invention resides in the provision of novel spring pressed clips which are constructed and arranged so as to enable automatic release of leaves carried thereby.

Still another very important object of the invention resides in the provision of a tobacco harvester which may comprise a frame detachably mountable on a tractor or other similar agricultural equipment.

Still further objects and features of this invention reside in the provision of a tobacco harvester that is strong and durable, simple in construction and operation, which is efficient in use, yet which is inexpensive to produce thereby permitting wide use and distribution.

These, together with the various ancillary objects and features of the invention which will become apparent as the following description proceeds, are attained by this tobacco harvester, preferred embodiments of the various portions thereof being shown in the accompanying drawings, by way of example only, wherein:

Figure 1 is a side elevational view of the tobacco harvester comprising the present invention;

Figure 2 is a partial perspective view of one means utilized for mounting the tobacco harvester on the axle of a tractor vehicle;

Figure 3 is a front elevational view of the tobacco harvester;

Figure 4 is a horizontal sectional detail view as taken along the plane of lines 4—4 in Figure 3;

Figure 5 is a perspective view of a seat supporting arrangement utilized in the invention;

Figure 6 is a sectional detail view as taken along the plane of line 6—6 in Figure 5;

Figure 7 is a sectional detail view as taken along the plane of line 7—7 in Figure 6;

Figure 12 is a plan view of a modified form of clip having a double capacity;

Figure 13 is a partial elevational view of a modified form of conveyor chain arrangement;

Figure 14 is a partial perspective view of a clip showing the manner of attachment to one of the endless conveyor chains;

Figure 15 is a partial perspective view of a portion of a clip shown with the spring pressed arms thereof removed and prior to attachment to the endless chain;

Figure 16 is a partial perspective view of the clip shown in conjunction with a portion of a trackway;

Figure 17 is a plan view of a kick-out mechanism for the tobacco leaves shown before engagement of the kick-out mechanism by a clip;

Figure 18 is a plan view of the kick-out mechanism of Figure 17 shown after engagement with a clip;

Figure 19 is an elevational view of the kick-out mechanism as shown in Figures 17 and 18;

Figure 20 is an enlarged sectional detail view illustrating the manner in which the seat supporting members are resiliently mounted in the tubular elements of the frame;

Figure 21 is a partial elevational view of a modified form of attachment of the frame to the tractor; and Figure 22 is a further elevational view of the form of attachment of the frame to the tractor as shown in Figure 21.

Figure 8:
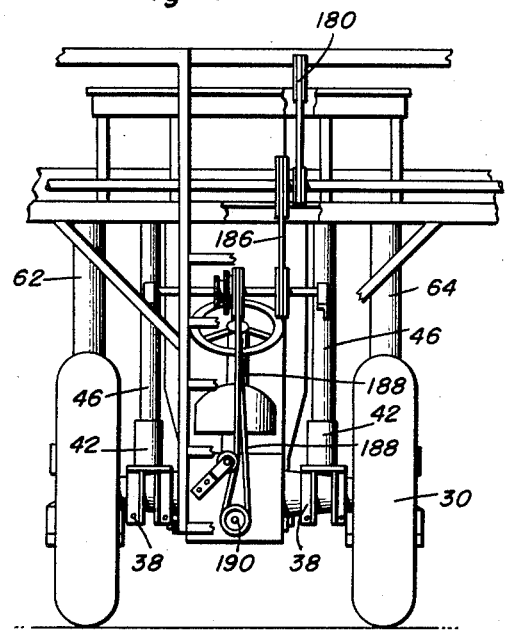
Figure 8 is a partial rear elevational view of the invention with portions thereof being broken away to show the drive mechanism in detail.

With continuing reference to the accompanying drawings wherein like reference numerals designate similar parts throughout the various views, reference numeral 30 generally designates a conventional tractor or the like which is used to provide the propelling power and the ground engaging means of the present invention. It is one of the concepts of the invention to detachably secure the frame 32 on the tractor 30. Various means may be utilized to detachably secure the frame 32 on the tractor. As is shown, there may be suitably positioned over the axles of the tractor 30 plates 34, see Figure 2, which have downwardly extending angle shaped legs 38. These legs may be perforated as at 40 for reception of bolts or other means for holding the plate 32 on the axles. Upwardly extending tubular members 42 rise from the plates 34. These tubular members 42 are adapted to receive the supporting standards 46 depending from the frame 32 thus providing the means for supporting the frame 32. This construction can also be readily seen in Figure 8.

Mounted on the frame 32 is a platform 50 of any suitable construction which may include planks, sheet metal or the like and on which various workmen can readily stand, these workmen serving as loopers or handlers of the tobacco leaves.

Outwardly depending from the front end of the frame 32, as can be seen best in Figures 1 and 3 are four tubular members 54, 56, 58 and 60. Two other similar tubular members 62 and 64 extend downwardly adjacent the rear portion of the frame 32. The tubular members 54, 56, 58, 60, 62 and 64 are each apertured for the reception of a locking member 66 which extends through the aperture in the tubular member and also through one of the vertically spaced apertures 68 in each of the downwardly depending seat support members 70, 72, 74, 76, 78, etc. As can be seen best in Figure 20, mounted on a rod 80 is a bracket 82 carrying eyes 84 to which the terminal ends of a spring 86 are secured. The spring is entrained about a pin 88 carried by the supporting member 76 so that the seat supporting member 76 will be resiliently carried by the tubular member 50 when the locking member 66 is not in position. It is to be noted that the seat support members 76 and the like may be readily rotated to at least 180° so that the seat supported thereby can be either facing forward or rearward. As can be readily seen in Figures 1 and 5 the seat support member 76 has an angle member 90 welded or otherwise attached thereto. Screw fasteners 92 are used to detachably secure to the angle member 90 a rectangular angle iron seat framework 94. The seat framework 94 is provided with a vertically extending portion 96 to which knuckles of a piano hinge 98 are attached so that the pintle 100 thereof can be readily utilized in further securing the seat member 94 to the seat supporting member 76. The knuckle 102 of the piano hinge 98 is secured to the seat support member 76 by means of a plate 104 welded thereto.

Carried by the frame 94 is a brace 106 for reception of the seat 108. A suitable foot rest 110 is secured to the framework 94 by means of bolts or other suitable fasteners extending through apertures as at 110 in the rectangular framework 94. It is possible to attach a seat member as can be readily seen in Figure 4 to the knuckle of a piano hinge 112 mounted on the opposite side of the seat support member 76 from the piano hinge 98. This will serve to support the framework 114 of the seat assembly on which the seat 116 is mounted since interlocking braces 118 can be utilized to joint the seat 114 with a seat assembly 120 attached to the piano hinge 122 carried by the seat support member 78.

Figure 9:
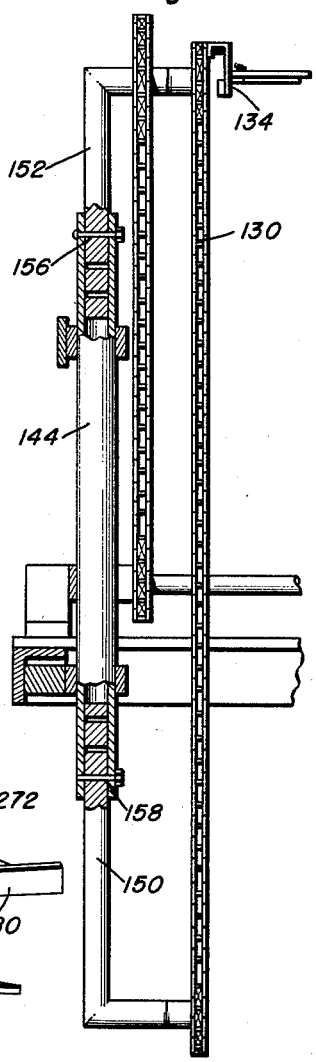
Figure 9 is an enlarged sectional detail view as taken along the plane of line 9—9 in Figure 4 illustrating in particular means utilized for driving the endless conveyor chains.

The seats 116 and 126 as can be seen best in Figure 1 are positioned behind runs of a conveyor chain 128. Another conveyor chain 130 of substantially the same construction is mounted on the other side of the tobacco harvester 30. These chains have suitable spring pressed clips 134 pivotally attached thereto and operating in the manner of the cages of a Ferris wheel so that the clips 134 stay in a substantially vertical position at all times. The chains 128 and 130 mounted on suitable preferably tubular support member as are indicated at 140, 142 and 144 which, as can be seen best in Figures 1 and 9 carry substantially L-shaped telescoping members 146, 148, 150, 152, and 154. The telescoping members may be held by suitable bolts or pins as are indicated at 156, 158, Figure 9, the bolts or pins 156 and 158 extending through aligned apertures in the telescoping members 146, 148, 150, 152 and 154 and through the tubular members 140, 142 and 144. The endless conveyor chain 128 is entrained about sprockets 160, 162, 164, 166, 168, as well as other sprockets 170 and 172 mounted on a plate 174 carried by the frame 32. The sprocket 166 is driven by means of being mounted on a shaft 180 which is driven by a drive sprocket 182 driven by a belt 184 through the belt and sprocket drive as indicated at 186, 188, connected to the power takeoff 190, Figures 1 and 8, of the tractor 30. Of course, any other suitable means for powering the endless chains 128 and 130 may be utilized. It is noted that the endless chain 130 is mounted in much the same manner as the endless conveyor chain 128.

Figure 10:
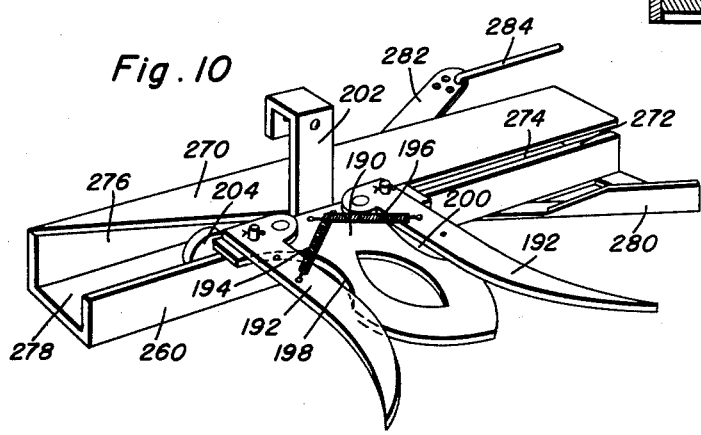
Figure 10 is a perspective view of one of the clips utilized in the present invention together with the kick-out mechanism for use in opening the clip to remove tobacco leaves from the clip.
Figure 11:
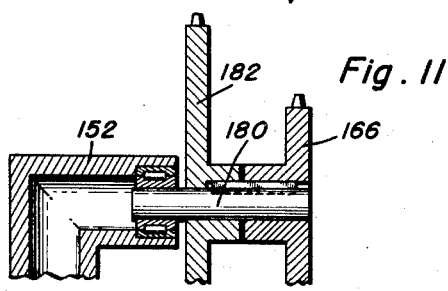
Figure 11 is a sectional detail view in an enlarged scale showing the mounting arrangement for the conveyor chains.

The clips may be of the type as can be seen best in Figure 10 and include a generally spade shaped member 190 having arms 192 and 194 pivotally secured thereto urged by springs 194 and 196 into the position shown whereby tobacco leaves may be readily held in the spaces as are indicated at 198 and 200 in a secure manner. The spade member 190 is affixed to a strap 202 which may be pivotally secured in any convenient manner to the endless chains 128 and 130. Pairs of rollers 204 are carried by the spade member 190. In the embodiment as is shown in Figure 14, the spade member 206 has a strap 208 secured thereto which strap is pivotally secured as at 210 to another strap 212 which is welded as at 214 to a chain of the type as is indicated at 216. Of course, there are provided suitably spring pressed pivotally mounted arms 218 and 220. Another embodiment of the invention can be seen in Figure 15, in which a single roller 222 is pivotally rotatably mounted on the spade member 224 in lieu of the pair of rollers 204. A different arrangement is shown in Figure 16 in which the spade member 226 has the strap 228 secured thereto, the roller being mounted rotatably on a shaft 230 carried by the strap 228, the roller being indicated at 232 and being engageable with a trackway 234 of any suitable shape in a manner as will be henceforth observed. In the embodiment of the invention as is shown in Figure 12, the chain indicated at 236 has a strap 238 secured thereto which carries a bar 240 having two spade shaped members 242 and 244 preferably integrally formed therewith. Pairs of arms 246, 248 and 250, 252 which are spring pressed as shown operate to enable the clips shown in Figure 12 to carry a double amount of tobacco leaves. Of course, a suitable number of rollers such as the pair of rollers 254 may be utilized in accordance therewith for cooperating with a trackway.

The trackway 260, see Figures 1 and 10, is supported by suitable braces 262, 264 on any suitable portion of the frame 32 or chain supporting members such as the telescoping members 146 and 154. The trackway 260 is positioned adjacent the substantially short horizontal portion 266 which is fed from the angularly upwardly extending run 268. This trackway 260 is generally of a channel shape having an overlying plate portion 270 which does not quite overlie the side edge 272 of the channel shaped portion of the trackway 260 leaving a space as at 274. Further, the overlying plate 270 is cut away as at 276 forming a triangle shaped entrance portion. The clips on the chain roll in the trackway 260 with the rollers 204 or the rollers of other forms of the clips are utilized engaging the bottom 278 and perhaps the top plate 270 of the trackway 260. The strap 202 passes through the opening 274. A kick-out member 280 positioned on the rear portion of the trackway 260 and is adapted to engage tobacco leaves so as to cause pivotal action of the arms 190 and hence force the tobacco leaves outward of the spade member 170 thus causing the tobacco leaves to drop on the platform 50. This is necessary because the loopers on the platform who are tying tobacco leaves on tobacco sticks may miss a few tobacco leave filled clips and these clips would otherwise make the journey around thus reducing the number of clips which can be filled by the primers or pickers of the tobacco leaves from the plant. The kick-out 280 slants angularly rearwardly and outwardly so as to drive the tobacco leaves from the spade member 190. In the form of the invention shown, this kick-out member 280 may be either rigidly fixed to the trackway 270 or pivotally attached and having an arm 282 may utilize a link 284 to adjustably position the kick-out 284 for sufficient operation.

In lieu of the pick-out arrangement including the trackway 260 as shown, reference may be had to the arrangement shown in Figures 17 through 19. In this form of the invention, a kick-out member 290 is utilized which includes a spring pressed mounting plate 292 mounting the hook member 294 pivotally secured thereto as at 296. This hook member has a spade shaped portion 298, a hook portion 300, and a push portion 302. Also pivotally mounted on the plate 292 and vertically spaced therefrom by means of rotatable shafting 310 is a locking member 312 which is adapted to be engaged by the strap 202 of the clip which seats in the recess 314 provided therein. Hence, when the strap portion 202 fits in the recess 314, the spade portion 298 will be urged into the position as is shown in Figure 18 thus forcing the tobacco leaves from the clip. Springs 316 and 318 return the kick-out assembly 290 to its original position.

In lieu of the chain arrangement for the chains 228 and 230, endless conveyor chains 340 can be utilized. These endless conveyor chains may be driven through a drive arrangement 342 as shown and mounted so as to have only angularly extending runs 344 and 346 so that loopers of various heights may be able to remove tobacco leaves from the run 344 at a comfortable height for them. The kick-out arrangement including a trackway of the nature shown in Figure 10 and indicated at 360 may be utilized or in lieu thereof the kick-out arrangement as is shown in Figures 17 through 19 can be utilized. It is noted in this form of the invention that the seats may be adjustably suspended from tubular mounting arrangements 362 by means of telescoping members 264 so that the seats may be rotated from one position to another and whereby the seats may be positioned to the rear of and convenient with respect to the chain 340.

In addition to the foregoing, one of the prime features of the invention is the endless belt conveyor 370, see Figure 1, which is driven through pulleys 372 which are driven by means of an endless belt 374 connected with the power take-off of the tractor 30. This endless conveyor belt can be readily fed by merely placing tobacco leaves on the belt by means of people sitting in the seats supported by the seat support structures 70 and 76 or by the seats supported by the seat support structures 72 and 74, see Figure 3.

Further, the tobacco leaves, if desired, may be tied by the picker directly onto tobacco sticks 380 mounted in eyes as at 382 carried by any supporting framework as may be desired. Other tobacco sticks 386 may be carried by the platform 50 in any suitable place thereon.

A canopy 390 may be provided for the entire harvester if desired.

As is shown in Figures 21 and 22, the frame 32 may be secured to the farm tractor by means of a disk 400 which carries a stub axle 402. This disk is utilized in lieu of the conventional hub cap and the stub axle 402 will rotate with the wheel 404 of the tractor. A bearing arrangement 406 is provided and upwardly extending support members 408 carrying the bearing 406 are mounted on the stub axles 402.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tobacco harvester comprising a wheeled frame, a platform supported on said frame, endless conveyor chains extending above said platform from therebelow, means supporting said conveyor chains on said frame, and an endless conveyor belt mounted on said frame, said conveyor belt extending above said platform from therebelow, tobacco receiving clips on said platform for automatically opening said clips to release tobacco leaves therefrom, seats vertically adjustably suspended from said frame, said seats being rotatable at least 180° from a position adjacent and in back of at least portions of said conveyor chains to a position adjacent said conveyor belt, said frame including tubular members, seat support members resiliently telescopically vertically adjustably and rotatably suspended from said tubular members, means for locking said seat support members relative to said tubular members, and seats carried by said seat support members.

2. A tobacco harvester comprising a wheeled frame, a platform supported on said frame, at least one endless conveyor chain, means supporting said conveyor chain on said frame, said conveyor chain extending above said platform from therebelow, tobacco receiving clips on said conveyor chain, and means disposed adjacent said chain above said platform for automatically opening said clips to release tobacco leaves therefrom, said last recited means including a trackway having a tobacco leaf engaging kick-out affixed thereto, said clips each having at least one roller appended thereto, said roller being engageable in said trackway, seats vertically adjustably suspended from said frame, said seats being rotatable at least 180° from a position adjacent and in back of at least portions to said conveyor chains to a position adjacent said conveyor belt.

3. A tobacco harvester comprising a wheeled frame, a platform supported on said frame, at least one endless conveyor chain, means supporting said conveyor chain on said frame, said conveyor chain extending above said platform from therebelow, tobacco receiving clips on said conveyor chain, and means disposed adjacent said chain above said platform for automatically opening said clips to release tobacco leaves therefrom, said last recited means including a trackway having a tobacco leaf engaging kick-out affixed thereto, said clips each having at least one roller appended thereto, said roller being engageable in said trackway, seats vertically adjustably suspended from said frame, said seats being rotatable at least 180° from a position adjacent and in back of at least portions to said conveyor chains to a position adjacent said conveyor belt, said frame including tubular members, seat support members resiliently telescopically vertically adjustably and rotatably suspended from said tubular members, means for locking said seat support members relative to said tubular members, and seats carried by said seat support members.

References Cited in the file of this patent

UNITED STATES PATENTS

| | | |
|---|---|---|
| 2,091,480 | Kaupke | Aug. 31, 1937 |
| 2,477,068 | La Motte | July 26, 1949 |
| 2,564,614 | Sowers | Aug. 14, 1951 |
| 2,675,136 | Spikes | Apr. 13, 1954 |
| 2,702,134 | Alphin | Feb. 15, 1955 |
| 2,704,158 | Long | Mar. 15, 1955 |
| 2,788,141 | Hendrix | Apr. 9, 1957 |
| 2,797,822 | Shaver | July 2, 1957 |
| 2,846,094 | Pilch | Aug. 5, 1958 |